No. 820,442.  
PATENTED MAY 15, 1906.  
W. T. SCHEELE.  
APPARATUS FOR PRESERVING BY LIQUID AIR.  
APPLICATION FILED JUNE 17, 1905.
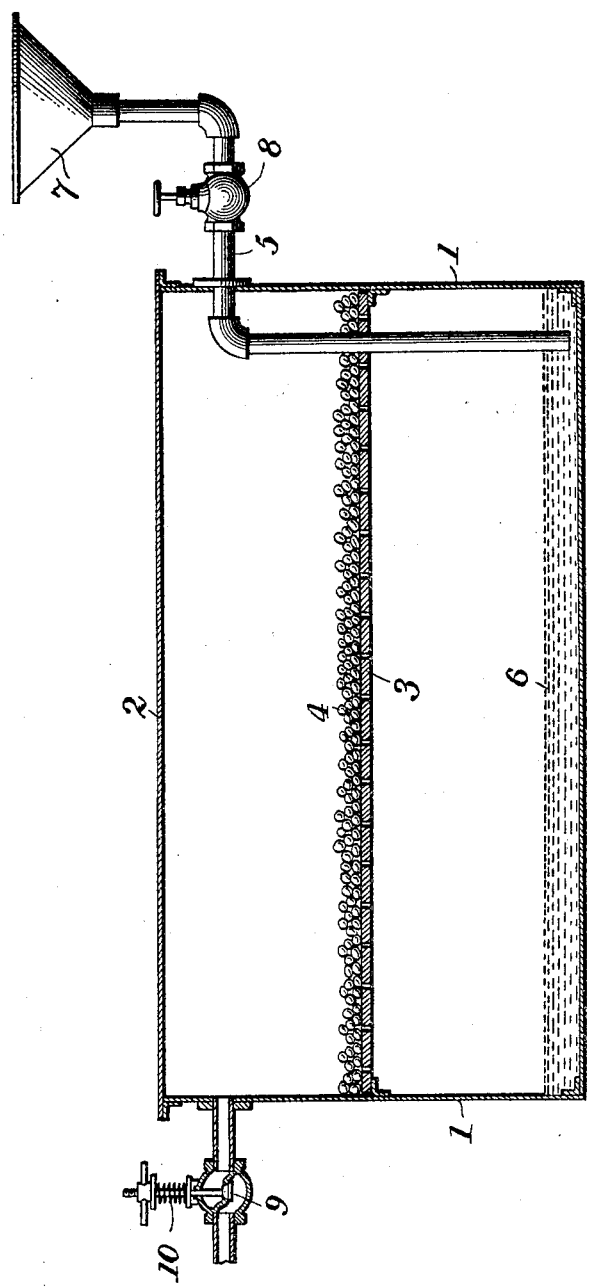

UNITED STATES PATENT OFFICE.

WALTER T. SCHEELE, OF BALTIMORE, MARYLAND, ASSIGNOR TO WILLIAM J. HOOPER, OF BALTIMORE, MARYLAND.

APPARATUS FOR PRESERVING BY LIQUID AIR.

No. 820,442.     Specification of Letters Patent.     Patented May 15, 1906.

Application filed June 17, 1905. Serial No. 265,752.

*To all whom it may concern:*

Be it known that I, WALTER T. SCHEELE, a subject of the German Emperor, and a resident of West Arlington, Baltimore city, Maryland, have invented certain new and useful Improvements in Apparatus for Preserving by Means of Liquid Air, of which the following is a specification.

The present invention comprises an apparatus for preserving animal or vegetable matter by the use of liquid air.

The process herein disclosed is claimed in a copending application, Serial No. 262,247, filed May 25, 1905. This process consists in placing the substance to be preserved in a closed vessel, together with a suitable proportion of liquid air. A small vent or valve is provided for the gradual escape of the air as it expands or gasifies. The substance to be dried is placed in such relation to the liquid air that the gasified air must pass through or over it, and thus absorb the moisture contained in it. The drying out of the moisture under these conditions is accomplished without heat, and the albumen in the substance under treatment is therefore not coagulated, but simply dried. Matter so dried may be restored to its natural condition by simple soaking it in pure water for a short time, the amount of time depending upon the nature of the substance.

In the accompanying drawing I have illustrated a simple form of apparatus embodying the present invention.

Referring to the drawing, 1 indicates a tank or box having a removable cover 2. Within the box is a tray 3, adapted to hold the substance 4 to be dried. The tray is perforated to permit of the circulation of air through the material 4.

The apparatus is provided with a filling-tube 5, through which liquid air 6 is introduced into the bottom of the tank. The filler may be provided with the usual funnel 7 and with a valve 8. The apparatus is also preferably provided with an air-escape valve 9, which is normally closed by a light spring 10.

The operation of the apparatus is as follows: The liquid air gradually gasifies and fills the apparatus with dry air. This air circulates through the material to be dried and finally passes out through the valve 9. It is found that the material under treatment will be rapidly dried by this simple apparatus and will retain to a large extent its natural color and appearance, although shrinking in size very materially.

Large fruits and vegetables, such as apples and potatoes, should be sliced in order to dry them more rapidly, while peas, beans, and other small vegetables, fruits, or seeds may be readily dried whole. Milk and other fluid substances may be dried by passing the gasified air through or in close contact therewith. In all substances subjected to my process of drying the albumen is found to be perfectly dry and not coagulated. It is for this reason that the color, taste, and other qualities of food products are preserved.

My invention may be embodied in apparatus of many different forms.

The essential features of the apparatus are a closed vessel adapted to receive the liquid air provided with a restricted discharge-opening for the gasified air, which opening is preferably closed by a light spring-pressed or weighted valve and a means in said vessel for sustaining the material to be dried above or out of contact with the liquid air, the apparatus being so arranged that the gasified air must pass through or in intimate contact with the said material.

Having described my invention, what I claim as new, and desire to secure by Letters Patent, is—

The herein-described preserving apparatus comprising a vessel normally closed to the outer air, a perforated tray or partition extending centrally across said vessel and providing an upper and lower compartment therein, a pipe extending into the upper compartment through the partition into the lower compartment, said pipe provided with a valve and an upwardly-projecting filling device, an outlet-pipe communicating with the upper compartment and provided with a spring-seated valve, so disposed that it may be overcome by the pressure from within the casing to unseat said valve, said perforated partition or tray serving to support the material to be treated in contact with the gasified liquid air in the lower compartment, substantially as described.

In testimony whereof I have signed my name to this specification in the presence of two subscribing witnesses.

WALTER T. SCHEELE.

Witnesses:
   WM. D. GOULD,
   GEO. W. F. VERNON.